US012782902B2

(12) United States Patent
Deelen et al.

(10) Patent No.: US 12,782,902 B2
(45) Date of Patent: Nov. 3, 2026

(54) METHOD OF PROCESSING DATA FROM A SUPERVISED PRODUCTION ENVIRONMENT

(71) Applicant: Heineken Supply Chain B.V., Amsterdam (NL)

(72) Inventors: Willem Gerrit Deelen, Bangalore (IN); Michiel Herman Maagd, Amsterdam (NL); Xiaoyun Bing, Utrecht (NL); Ramon Marin Ramirez, Amsterdam (NL); David Pavlovic, Breda (NL)

(73) Assignee: Heineken Supply Chain B.V., Amsterdam (NL)

( * ) Notice: Subject to any disclaimer, the term of this patent is extended or adjusted under 35 U.S.C. 154(b) by 321 days.

(21) Appl. No.: 18/712,748

(22) PCT Filed: Nov. 24, 2022

(86) PCT No.: PCT/NL2022/050682
§ 371 (c)(1),
(2) Date: May 23, 2024

(87) PCT Pub. No.: WO2023/096490
PCT Pub. Date: Jun. 10, 2023

(65) Prior Publication Data

US 2025/0021071 A1 Jan. 16, 2025

(30) Foreign Application Priority Data

Nov. 24, 2021 (EP) .................................... 21210314

(51) Int. Cl.
*G05B 19/05* (2006.01)

(52) U.S. Cl.
CPC .. *G05B 19/058* (2013.01); *G05B 2219/14006* (2013.01)

(58) Field of Classification Search
CPC .. G05B 19/058; G05B 19/042; G05B 19/048; G05B 19/418; G05B 19/05;
(Continued)

(56) References Cited

U.S. PATENT DOCUMENTS 7,644,120 B2 * 1/2010 Todorov .............. H04L 41/0226 709/217
7,894,460 B2 * 2/2011 Carpman ............. G05B 19/058 709/217
(Continued)

FOREIGN PATENT DOCUMENTS

CN 107580013 A 1/2018
CN 111756626 A * 10/2020 ........... H04L 69/162
(Continued)

OTHER PUBLICATIONS

OPC Unified Architecture Specification Part 1: Overview and Concepts Release 1.02 (Year: 2012).*
OPC UA Configuration Manager, PTC, Inc. 2021 (Year: 2021).*
Alves et al., "Securing SCADA Applications Using OpenPLC With End-To-End Encryption," ACM, 2017 (Year: 2017).*
(Continued)

*Primary Examiner* — Alina A Boutah
(74) *Attorney, Agent, or Firm* — Banner & Witcoff, Ltd.

(57) ABSTRACT

In an electronic computing system, a method is provided for processing device data available in a supervised production environment comprising production devices. The method comprises receiving a data request for providing production data related to a production parameter of a production device, obtaining device connectivity data related to the production device, setting up a data request message for requesting the production data in accordance with the device connectivity data and addressing a production device communication module of the production device in accordance with the device connectivity data. The method further comprises, if the addressing is successful, sending the data request message to the production device communication module in accordance with the device connectivity data,
(Continued)

receiving the requested data related to a production parameter of the production device from the production device communication module; and presenting the received data.

15 Claims, 2 Drawing Sheets

(58) Field of Classification Search
CPC ...... G05B 19/4185; G05B 2219/14006; G05B 2219/31174; G05B 2219/31229; G05B 2219/31232; G05B 2219/31326; G05B 2219/31369; G05B 23/02; G05B 23/0281; H04L 67/00; H04L 67/12; H04L 67/125; H04L 67/568; H04L 43/00; H04L 43/08; H04L 43/10; H04L 12/24; H04L 12/26; H04L 12/28; H04L 41/00; H04L 41/0893; H04L 41/50; H04L 41/5048; H04L 41/06; H04L 41/0631; H04L 41/0654; G06F 16/245; G06F 16/29; G06F 9/50; G06F 9/54; G06F 11/30; G06F 11/34; G06F 11/36; G06F 11/07; H04W 4/70
See application file for complete search history.

(56) References Cited

U.S. PATENT DOCUMENTS 8,423,608 B2 * 4/2013 Mahnke ................ H04L 67/125 709/227
10,331,155 B1 6/2019 Roche
11,204,678 B1 12/2021 Baker et al.
11,265,292 B1 3/2022 Leviseur
11,392,889 B1 7/2022 Degranville et al.
11,397,750 B1 7/2022 Lekakis et al.
11,422,882 B1 8/2022 Chhabra
11,526,643 B1 12/2022 Swanson
11,531,651 B1 12/2022 Markley et al.
11,531,789 B1 12/2022 Eberhardt et al.
11,593,669 B1 2/2023 Chhabra et al.
11,637,749 B1 4/2023 Patel et al.
11,656,605 B1 5/2023 Manley et al.
11,671,640 B1 6/2023 Modi et al.
11,691,756 B1 7/2023 Ludington et al.
11,693,540 B1 7/2023 Zou et al.
11,693,622 B1 7/2023 Elders et al.
11,693,678 B1 7/2023 Carl et al.
11,694,147 B1 7/2023 AbdElHalim Aly Ismail et al.
11,694,437 B1 7/2023 Desai et al.
11,694,682 B1 7/2023 Reinspach et al.
11,695,632 B1 7/2023 Zoualfaghari et al.
11,698,914 B1 7/2023 Duvedi et al.
11,698,940 B1 7/2023 Canfield et al.
11,698,969 B1 7/2023 Henriquez Garcia
11,699,287 B1 7/2023 Wang et al.
11,699,444 B1 7/2023 Puri et al.
11,700,376 B1 7/2023 Nandakumar et al.
11,703,861 B1 7/2023 Paschall et al.
11,703,986 B1 7/2023 Hsu et al.
11,704,033 B1 7/2023 Narendra et al.
11,704,099 B1 7/2023 Morse et al.
11,704,145 B1 7/2023 Katcoff et al.
11,704,193 B1 7/2023 Shenhar et al.
11,704,211 B1 7/2023 Kaplan et al.
11,704,229 B1 7/2023 Li et al.
11,704,299 B1 7/2023 Bansal et al.
11,704,380 B1 7/2023 Brasch
11,704,408 B1 7/2023 Ciubotariu et al.
11,704,577 B1 7/2023 Chen et al.
11,704,589 B1 7/2023 Sohoney et al.
11,705,108 B1 7/2023 Radostev et al.
11,705,133 B1 7/2023 Aggarwal et al.
11,707,838 B1 7/2023 Vogelsong et al.
11,709,464 B1 7/2023 Dhalla et al.
11,709,741 B1 7/2023 Uppal et al.
11,709,809 B1 7/2023 Li et al.
11,709,925 B1 7/2023 Bellman-Greenwood et al.
11,709,941 B1 7/2023 Cohen et al.
11,710,355 B1 7/2023 Wenneman et al.
11,710,479 B1 7/2023 Shenoy et al.
11,711,314 B1 7/2023 Nalam
11,714,573 B1 8/2023 Bhardwaj et al.
11,714,682 B1 8/2023 Shahane et al.
11,714,732 B1 8/2023 Wires et al.
11,714,796 B1 8/2023 Srivastava et al.
11,714,877 B1 8/2023 Shoshan et al.
11,714,918 B1 8/2023 Kondal et al.
11,714,954 B1 8/2023 Manason et al.
11,714,992 B1 8/2023 Heaton et al.
11,716,036 B1 8/2023 Shverdin et al.
11,716,323 B1 8/2023 Moghal
11,720,098 B1 8/2023 Hu et al.
11,720,117 B1 8/2023 Kim et al.
11,720,425 B1 8/2023 Yang et al.
11,720,444 B1 8/2023 Naaman et al.
11,720,448 B1 8/2023 Sirotin et al.
11,720,536 B1 8/2023 Kisser et al.
11,720,548 B1 8/2023 Opincariu et al.
11,720,850 B1 8/2023 Malshe et al.
11,720,942 B1 8/2023 Bazzani et al.
11,721,331 B1 8/2023 Kinsey
11,721,332 B1 8/2023 Mokady et al.
11,722,319 B1 8/2023 Yancey
11,726,638 B1 8/2023 Dao et al.
11,726,665 B1 8/2023 Sabbag et al.
11,726,954 B1 8/2023 Rungta et al.
11,726,981 B1 8/2023 Plenderleith
11,726,982 B1 8/2023 Azam et al.
11,726,994 B1 8/2023 Wang et al.
11,726,999 B1 8/2023 Vig et al.
11,727,224 B1 8/2023 Maricic
11,727,917 B1 8/2023 Gejji
11,729,171 B1 8/2023 Wasiq et al.
11,734,038 B1 8/2023 Tsai et al.
11,734,242 B1 8/2023 Bouyarmane
11,734,290 B1 8/2023 Nazarov et al.
11,734,379 B1 8/2023 Ranganathan et al.
11,734,512 B1 8/2023 Feyisetan
11,734,614 B1 8/2023 Wang et al.
11,734,937 B1 8/2023 Pushkin et al.
11,736,497 B1 * 8/2023 Rooyakkers ....... G05B 19/4185
11,736,525 B1 8/2023 Rungta et al.
11,736,665 B1 8/2023 Lemberger et al.
11,740,710 B1 8/2023 Aalund et al.
11,741,078 B1 8/2023 Narendra et al.
11,741,096 B1 8/2023 Kanuparthy et al.
11,741,168 B1 8/2023 Bodapati et al.
11,741,418 B1 8/2023 Lefkow et al.
11,741,945 B1 8/2023 Sullivan et al.
11,741,962 B1 8/2023 Mahar et al.
11,741,969 B1 8/2023 Rao et al.
11,741,971 B1 8/2023 You et al.
11,741,979 B1 8/2023 Scalise et al.
11,742,692 B1 8/2023 Girvin et al.
11,743,282 B1 8/2023 Torkamani et al.
11,743,325 B1 8/2023 Dunsmore et al.
11,744,037 B1 8/2023 Cai et al.
11,748,120 B1 9/2023 Tong et al.
11,748,253 B1 9/2023 Hariharan et al.
11,748,260 B1 9/2023 Sorenson, III et al.
11,748,285 B1 9/2023 Haim et al.
11,748,328 B1 9/2023 Certain
11,748,389 B1 9/2023 Broomall et al.
11,748,413 B1 9/2023 Yoon et al.
11,748,492 B1 9/2023 Campagna
11,748,568 B1 9/2023 Orhan et al.
11,748,610 B1 9/2023 Majumder et al.
11,748,622 B1 9/2023 Borkovic et al.
11,748,647 B1 9/2023 Zeng et al.
11,748,681 B1 9/2023 Takhtani et al.
11,748,686 B1 9/2023 Kwan et al.
11,748,713 B1 9/2023 Tran et al.
11,748,714 B1 9/2023 Gada et al.
11,748,988 B1 9/2023 Chen et al.

(56) References Cited

U.S. PATENT DOCUMENTS 11,749,122 B1 9/2023 Kimchi et al.
11,750,475 B1 9/2023 Gonzalez et al.
11,750,566 B1 9/2023 Montilla Lugo
11,750,695 B1 9/2023 Gupta et al.
11,750,706 B1 9/2023 Watson et al.
11,755,455 B1 9/2023 Kuo et al.
11,755,496 B1 9/2023 Barry et al.
11,755,536 B1 9/2023 Pushkin
11,755,603 B1 9/2023 Venkatesan et al.
11,755,620 B1 9/2023 Jain et al.
11,755,756 B1 9/2023 Cline et al.
11,755,758 B1 9/2023 Southwood et al.
11,756,036 B1 9/2023 Aggarwal et al.
11,756,049 B1 9/2023 Shankar
11,756,107 B1 9/2023 Sigler et al.
11,756,541 B1 9/2023 Mrani et al.
11,756,550 B1 9/2023 Alvarez Barrio et al.
11,757,848 B1 9/2023 Zieh et al.
11,760,482 B1 9/2023 Durand
11,760,580 B1 9/2023 Gomez et al.
11,762,390 B1 9/2023 Alagic et al.
11,762,693 B1 9/2023 Maclinovsky et al.
11,762,760 B1 9/2023 Fost et al.
11,762,860 B1 9/2023 Rahman et al.
11,762,984 B1 9/2023 Roth et al.
11,763,086 B1 9/2023 Sandu et al.
11,763,154 B1 9/2023 Lupesko et al.
11,763,338 B1 9/2023 Tran
11,763,564 B1 9/2023 Sadoughi Nourabadi et al.
11,763,809 B1 9/2023 Bobbili et al.
11,763,816 B1 9/2023 Sundararaman et al.
11,763,819 B1 9/2023 Eagan et al.
11,763,835 B1 9/2023 Bay et al.
11,765,155 B1 9/2023 Srinivasan et al.
11,768,630 B1 9/2023 Avron et al.
11,768,818 B1 9/2023 Pedapati et al.
11,768,830 B1 9/2023 Brahmadesam et al.
11,768,914 B1 9/2023 Agarwal et al.
11,768,937 B1 9/2023 Ciubotariu
11,768,948 B1 9/2023 Buonora
11,768,990 B1 9/2023 Leder et al.
11,769,019 B1 9/2023 Mathur et al.
11,769,110 B1 9/2023 Bourke et al.
11,769,496 B1 9/2023 Prasad et al.
11,770,294 B1 9/2023 Wylie et al.
11,770,437 B1 9/2023 Kallampally et al.
11,771,863 B1 10/2023 Alshan et al.
11,772,833 B1 10/2023 Shi et al.
11,774,986 B1 10/2023 Meiswinkel
11,775,119 B1 10/2023 Song et al.
11,775,186 B1 10/2023 Setter et al.
11,775,268 B1 10/2023 Briggs et al.
11,775,299 B1 10/2023 Borkovic
11,775,417 B1 10/2023 Arora et al.
11,775,430 B1 10/2023 Diamant et al.
11,775,545 B1 10/2023 Fritz et al.
11,775,584 B1 10/2023 Sharma
11,775,617 B1 10/2023 Jaiswal et al.
11,775,640 B1 10/2023 Sathe et al.
11,775,868 B1 10/2023 Song et al.
11,775,930 B1 10/2023 Curlander et al.
11,775,936 B1 10/2023 Zhang et al.
11,776,021 B1 10/2023 Gyanchandani et al.
11,776,047 B1 10/2023 Jain et al.
11,776,262 B1 10/2023 Chen et al.
11,776,273 B1 10/2023 Chen et al.
11,776,534 B1 10/2023 Kulakarni et al.
11,777,914 B1 10/2023 Norum
11,778,025 B1 10/2023 Kukreja et al.
11,778,277 B1 10/2023 Bryan et al.
11,782,706 B1 10/2023 Diamant et al.
11,782,713 B1 10/2023 Shah et al.
11,782,726 B1 10/2023 Wasserstrom et al.
11,782,731 B1 10/2023 Lin et al.
11,782,865 B1 10/2023 Kochavi et al.
11,782,955 B1 10/2023 Jindal et al.
11,782,960 B1 10/2023 Subramanian et al.
11,782,978 B1 10/2023 Zakian et al.
11,782,983 B1 10/2023 Malavade et al.
11,783,325 B1 10/2023 Strong
11,783,560 B1 10/2023 Agarwal et al.
11,783,613 B1 10/2023 Guigues et al.
11,783,805 B1 10/2023 Nadig et al.
11,783,824 B1 10/2023 Mars
11,783,831 B1 10/2023 Lantin et al.
11,783,834 B1 10/2023 Gyanchandani et al.
11,784,951 B1 10/2023 Jenks et al.
11,785,051 B1 10/2023 Rossman et al.
11,785,272 B1 10/2023 Singh
11,787,294 B1 10/2023 Gupta
11,789,457 B1 10/2023 Woo et al.
11,789,525 B1 10/2023 Kouxommone et al.
11,789,781 B1 10/2023 Murthy et al.
11,789,807 B1 10/2023 Kochavi et al.
11,789,859 B1 10/2023 Xu et al.
11,789,911 B1 10/2023 Surabhi et al.
11,789,922 B1 10/2023 Jain et al.
11,789,971 B1 10/2023 Kuppahally et al.
11,789,977 B1 10/2023 Mehta et al.
11,789,989 B1 10/2023 Liu et al.
11,790,049 B1 10/2023 Dhir et al.
11,790,059 B1 10/2023 Gayles et al.
11,790,075 B1 10/2023 Oswal et al.
11,790,080 B1 10/2023 Flatten et al.
11,790,092 B1 10/2023 Chakrabarti
11,790,304 B1 10/2023 Zeng et al.
11,790,405 B1 10/2023 Chud
11,790,437 B1 10/2023 Hazlewood et al.
11,790,558 B1 10/2023 Balakrishnan et al.
11,790,630 B1 10/2023 Siddiquie et al.
11,790,695 B1 10/2023 Aggarwal et al.
11,792,143 B1 10/2023 Shah
11,792,215 B1 10/2023 Atay
11,792,299 B1 10/2023 Bshara et al.
11,792,301 B1 10/2023 Du et al.
11,792,365 B1 10/2023 Vida et al.
11,792,467 B1 10/2023 Kumar et al.
11,796,378 B1 10/2023 Riggs et al.
11,797,020 B1 10/2023 Jiang et al.
11,797,022 B1 10/2023 Ballantyne et al.
11,797,276 B1 10/2023 Shi et al.
11,797,280 B1 10/2023 Kannan et al.
11,797,287 B1 10/2023 Ghai et al.
11,797,317 B1 10/2023 McLaughlin et al.
11,797,418 B1 10/2023 Tyrewalla et al.
11,797,521 B1 10/2023 Vig et al.
11,797,530 B1 10/2023 Bouyarmane
11,797,535 B1 10/2023 Stefani et al.
11,797,572 B1 10/2023 Naamad et al.
11,797,705 B1 10/2023 Voinea et al.
11,797,769 B1 10/2023 Gangadharaiah et al.
11,797,876 B1 10/2023 Wang et al.
11,797,920 B1 10/2023 McDaniel et al.
11,798,248 B1 10/2023 Shchurko et al.
11,798,538 B1 10/2023 Parker et al.
11,799,796 B1 10/2023 Atluri et al.
11,799,826 B1 10/2023 Lough et al.
11,799,940 B1 10/2023 Matthews et al.
11,799,950 B1 10/2023 Banerjee et al.
11,800,404 B1 10/2023 Yang et al.
11,803,188 B1 10/2023 Gupta et al.
11,803,407 B1 10/2023 Gadalin et al.
11,803,420 B1 10/2023 Kinney, Jr. et al.
11,803,448 B1 10/2023 Pani et al.
11,803,460 B1 10/2023 Carpenter et al.
11,803,524 B1 10/2023 Dwarakanath et al.
11,803,561 B1 10/2023 Hurst et al.
11,803,568 B1 10/2023 Jain et al.
11,803,577 B1 10/2023 Onstott et al.
11,803,621 B1 10/2023 Strong
11,803,642 B1 10/2023 Ciubotariu
11,803,650 B1 10/2023 Hocanin et al.
11,803,736 B1 10/2023 Meyer et al.
11,803,766 B1 10/2023 Srinivasan et al.

(56) References Cited

U.S. PATENT DOCUMENTS

| | | | |
|---|---|---|---|
| 11,803,801 B1 | 10/2023 | Kimchi et al. | |
| 11,804,038 B1 | 10/2023 | Kahn et al. | |
| 11,804,060 B1 | 10/2023 | Zhao et al. | |
| 11,805,109 B1 | 10/2023 | Khare et al. | |
| 11,809,150 B1 | 11/2023 | Raeber et al. | |
| 11,809,151 B1 | 11/2023 | Brett et al. | |
| 11,809,349 B1 | 11/2023 | Saidi et al. | |
| 11,809,404 B1 | 11/2023 | Mritunjai et al. | |
| 11,809,520 B1 | 11/2023 | D'Innocente et al. | |
| 11,809,686 B1 | 11/2023 | Beebe et al. | |
| 11,809,735 B1 | 11/2023 | Kumar et al. | |
| 11,809,841 B1 | 11/2023 | Zhang et al. | |
| 11,809,849 B1 | 11/2023 | Zheng et al. | |
| 11,809,953 B1 | 11/2023 | Jacob et al. | |
| 11,809,981 B1 | 11/2023 | Jain et al. | |
| 11,810,056 B1 | 11/2023 | Eccles et al. | |
| 11,810,155 B1 | 11/2023 | Gilbert et al. | |
| 11,810,163 B1 | 11/2023 | Kalanadhabhatla et al. | |
| 11,810,174 B1 | 11/2023 | Katariya et al. | |
| 11,810,345 B1 | 11/2023 | Gayaka et al. | |
| 11,810,362 B1 | 11/2023 | Siddiquie et al. | |
| 11,810,560 B1 | 11/2023 | Vanderschaegen et al. | |
| 11,811,783 B1 | 11/2023 | Suleiman et al. | |
| 11,811,884 B1 | 11/2023 | Gochenaur et al. | |
| 11,816,056 B1 | 11/2023 | Welch et al. | |
| 11,816,073 B1 | 11/2023 | Chakrabarti et al. | |
| 11,816,081 B1 | 11/2023 | Opincariu et al. | |
| 11,816,103 B1 | 11/2023 | Goel et al. | |
| 11,816,153 B1 | 11/2023 | Jain et al. | |
| 11,816,236 B1 | 11/2023 | Gupta et al. | |
| 11,816,394 B1 | 11/2023 | Carlson et al. | |
| 11,816,612 B1 | 11/2023 | Maurya et al. | |
| 11,816,712 B1 | 11/2023 | Portman et al. | |
| 11,816,720 B1 | 11/2023 | Fernandez Galan | |
| 11,816,932 B1 | 11/2023 | Tang et al. | |
| 11,817,091 B1 | 11/2023 | Singh et al. | |
| 11,818,004 B1 | 11/2023 | Bannihatti Kumar et al. | |
| 11,818,134 B1 | 11/2023 | Gibson et al. | |
| 11,818,174 B1 | 11/2023 | Strong | |
| 11,818,227 B1 | 11/2023 | Kumar et al. | |
| 11,818,842 B1 | 11/2023 | Carrillo et al. | |
| 11,822,690 B1 | 11/2023 | Sultan et al. | |
| 11,822,770 B1 | 11/2023 | Antos et al. | |
| 11,822,885 B1 | 11/2023 | Sundararaman et al. | |
| 11,823,094 B1 | 11/2023 | Kumar et al. | |
| 11,823,118 B1 | 11/2023 | Cao et al. | |
| 11,823,488 B1 | 11/2023 | Ranjan et al. | |
| 11,823,549 B1 | 11/2023 | Meyers et al. | |
| 11,823,671 B1 | 11/2023 | Ramachandra et al. | |
| 11,823,681 B1 | 11/2023 | Adams et al. | |
| 11,824,735 B1 | 11/2023 | Prateek et al. | |
| 11,829,280 B1 | 11/2023 | Zhang et al. | |
| 11,829,332 B1 | 11/2023 | Nayar et al. | |
| 11,829,384 B1 | 11/2023 | Lu et al. | |
| 11,829,413 B1 | 11/2023 | Hao et al. | |
| 11,829,445 B1 | 11/2023 | Bazzani et al. | |
| 11,829,516 B1 | 11/2023 | Raj | |
| 11,829,575 B1 | 11/2023 | Luvaas et al. | |
| 11,829,595 B1 | 11/2023 | Aggarwal et al. | |
| 11,829,717 B1 | 11/2023 | Chen et al. | |
| 11,829,792 B1 | 11/2023 | Chandrashekar | |
| 11,829,923 B1 | 11/2023 | Evans et al. | |
| 11,829,943 B1 | 11/2023 | Mohanty et al. | |
| 11,829,945 B1 | 11/2023 | Goldstein et al. | |
| 11,830,157 B1 | 11/2023 | Ditzler et al. | |
| 11,831,644 B1 | 11/2023 | Thakore | |
| 11,831,773 B1 | 11/2023 | Sadras Sudhakar et al. | |
| 11,835,947 B1 | 12/2023 | Siegel et al. | |
| 11,835,968 B1 | 12/2023 | Szmuk | |
| 11,836,103 B1 | 12/2023 | Nakibly et al. | |
| 11,836,125 B1 | 12/2023 | Skinner et al. | |
| 11,836,160 B1 | 12/2023 | Xia et al. | |
| 11,836,264 B1 | 12/2023 | Ioannidis et al. | |
| 11,836,379 B1 | 12/2023 | Jo et al. | |
| 11,836,420 B1 | 12/2023 | Levanti et al. | |
| 11,836,545 B1 | 12/2023 | Khalid et al. | |
| 11,837,215 B1 | 12/2023 | Srivatsa et al. | |
| 11,837,225 B1 | 12/2023 | Brown et al. | |
| 11,837,229 B1 | 12/2023 | Fan et al. | |
| 11,837,368 B1 | 12/2023 | Helton et al. | |
| 11,838,296 B1 | 12/2023 | Rossman et al. | |
| 11,841,780 B1 | 12/2023 | Baldawa et al. | |
| 11,841,792 B1 | 12/2023 | Diamant | |
| 11,841,861 B1 | 12/2023 | Kumar et al. | |
| 11,841,863 B1 | 12/2023 | Aydore et al. | |
| 11,841,925 B1 | 12/2023 | Chakraborty et al. | |
| 11,842,085 B1 | 12/2023 | Sreekanthan et al. | |
| 11,842,159 B1 | 12/2023 | Kumar et al. | |
| 11,842,169 B1 | 12/2023 | Elmer | |
| 11,842,217 B1 | 12/2023 | Christopher et al. | |
| 11,842,224 B1 | 12/2023 | Sharifi Mehr | |
| 11,842,321 B1 | 12/2023 | Zou et al. | |
| 11,842,738 B1 | 12/2023 | Yan et al. | |
| 11,845,616 B1 | 12/2023 | De La Rosa et al. | |
| 11,847,241 B1 | 12/2023 | Cahill et al. | |
| 11,847,406 B1 | 12/2023 | Mallya Kasaragod et al. | |
| 11,847,424 B1 | 12/2023 | Harkous et al. | |
| 11,847,477 B1 | 12/2023 | Botero | |
| 11,847,507 B1 | 12/2023 | Borkovic | |
| 11,847,603 B1 | 12/2023 | Roy Chowdhury et al. | |
| 11,847,629 B1 | 12/2023 | Mehta et al. | |
| 11,847,670 B1 | 12/2023 | Zhou et al. | |
| 11,847,680 B1 | 12/2023 | Victor et al. | |
| 11,847,860 B1 | 12/2023 | Maron et al. | |
| 11,848,655 B1 | 12/2023 | Khalilia et al. | |
| 11,849,037 B1 | 12/2023 | Tong et al. | |
| 11,853,077 B1 | 12/2023 | Glas | |
| 11,853,114 B1 | 12/2023 | Ridoux et al. | |
| 11,853,159 B1 | 12/2023 | Chamberland et al. | |
| 11,853,257 B1 | 12/2023 | Navarro et al. | |
| 11,853,273 B1 | 12/2023 | Stephan et al. | |
| 11,853,317 B1 | 12/2023 | Goyal | |
| 11,853,318 B1 | 12/2023 | He et al. | |
| 11,853,319 B1 | 12/2023 | Kim et al. | |
| 11,853,321 B1 | 12/2023 | Kumar et al. | |
| 11,853,388 B1 | 12/2023 | Natarajan et al. | |
| 11,853,390 B1 | 12/2023 | Bowman et al. | |
| 11,853,391 B1 | 12/2023 | Ladkat et al. | |
| 11,853,401 B1 | 12/2023 | Nookula et al. | |
| 11,853,753 B1 | 12/2023 | Chawda et al. | |
| 11,853,771 B1 | 12/2023 | Bowen et al. | |
| 11,853,783 B1 | 12/2023 | Aboubakr et al. | |
| 11,853,785 B1 | 12/2023 | Tsai et al. | |
| 11,853,802 B1 | 12/2023 | Wei et al. | |
| 11,853,807 B1 | 12/2023 | Coult et al. | |
| 11,853,912 B1 | 12/2023 | Kasiviswanathan et al. | |
| 11,853,960 B1 | 12/2023 | Polim et al. | |
| 11,853,961 B1 | 12/2023 | Bergamo | |
| 11,853,975 B1 | 12/2023 | Leblang et al. | |
| 11,854,040 B1 | 12/2023 | George et al. | |
| 11,854,544 B1 | 12/2023 | Weiss et al. | |
| 11,854,575 B1 | 12/2023 | Pinkus et al. | |
| 11,855,757 B1 | 12/2023 | Ridoux et al. | |
| 11,856,125 B1 | 12/2023 | Rao et al. | |
| 11,856,674 B1 | 12/2023 | Sanchez et al. | |
| 12,568,143 B2 * | 3/2026 | Zhou | H04L 12/66 |
| 2004/0162887 A1 | 8/2004 | Dillon et al. | |
| 2007/0130572 A1 * | 6/2007 | Gilbert | G05B 19/0426 719/318 |
| 2010/0306313 A1 * | 12/2010 | Mahnke | G06F 9/466 709/203 |
| 2011/0178977 A1 * | 7/2011 | Drees | G05B 15/02 706/52 |
| 2013/0198408 A1 | 8/2013 | Blair | |
| 2015/0066979 A1 * | 3/2015 | Zhang | G06F 16/245 707/769 |
| 2016/0241511 A1 * | 8/2016 | Albrecht | G05B 19/4185 |
| 2023/0104676 A1 | 4/2023 | Mokashi et al. | |
| 2023/0129761 A1 | 4/2023 | Kotecha et al. | |
| 2023/0136943 A1 | 5/2023 | Pingale et al. | |
| 2023/0146690 A1 | 5/2023 | Park et al. | |
| 2023/0172442 A1 | 6/2023 | Tsuneto et al. | |
| 2023/0177451 A1 | 6/2023 | Lohan et al. | |
| 2023/0183057 A1 | 6/2023 | Xereas et al. | |

(56) References Cited

U.S. PATENT DOCUMENTS

| | | | |
|---|---|---|---|
| 2023/0183274 | A1 | 6/2023 | Noshi et al. |
| 2023/0183704 | A1 | 6/2023 | Stuart et al. |
| 2023/0183728 | A1 | 6/2023 | Senger et al. |
| 2023/0183748 | A1 | 6/2023 | Feng et al. |
| 2023/0192085 | A1 | 6/2023 | Woo |
| 2023/0192308 | A1 | 6/2023 | Gardel et al. |
| 2023/0192776 | A1 | 6/2023 | Young |
| 2023/0192910 | A1 | 6/2023 | Baldwin et al. |
| 2023/0214768 | A1 | 7/2023 | Kumar et al. |
| 2023/0215425 | A1 | 7/2023 | Sarikaya et al. |
| 2023/0216927 | A1 | 7/2023 | Devaraj et al. |
| 2023/0219852 | A1 | 7/2023 | Tiner et al. |
| 2023/0221971 | A1 | 7/2023 | Wasserstrom et al. |
| 2023/0222566 | A1 | 7/2023 | Herd et al. |
| 2023/0225537 | A1 | 7/2023 | Johnson |
| 2023/0229601 | A1 | 7/2023 | Coughlin et al. |
| 2023/0229637 | A1 | 7/2023 | Krishnan et al. |
| 2023/0229645 | A1 | 7/2023 | Vermeulen et al. |
| 2023/0231841 | A1 | 7/2023 | Sirota |
| 2023/0239289 | A1 | 7/2023 | Roth et al. |
| 2023/0239345 | A1 | 7/2023 | Mercier et al. |
| 2023/0240262 | A1 | 8/2023 | Liu |
| 2023/0250383 | A1 | 8/2023 | Susarrey Arce et al. |
| 2023/0252325 | A1 | 8/2023 | Gupta et al. |
| 2023/0254363 | A1 | 8/2023 | Richardson et al. |
| 2023/0255002 | A1 | 8/2023 | Bryan et al. |
| 2023/0260008 | A1 | 8/2023 | Beguin et al. |
| 2023/0260501 | A1 | 8/2023 | Trueba et al. |
| 2023/0262087 | A1 | 8/2023 | Dodge et al. |
| 2023/0262111 | A1 | 8/2023 | Liguori et al. |
| 2023/0267407 | A1 | 8/2023 | Lazier et al. |
| 2023/0273735 | A1 | 8/2023 | Shobash |
| 2023/0273809 | A1 | 8/2023 | Vincent et al. |
| 2023/0273937 | A1 | 8/2023 | Vig et al. |
| 2023/0280908 | A1 | 9/2023 | Sivasubramanian et al. |
| 2023/0281181 | A1 | 9/2023 | McHugh et al. |
| 2023/0281211 | A1 | 9/2023 | Han et al. |
| 2023/0281276 | A1 | 9/2023 | Thomas et al. |
| 2023/0281294 | A1 | 9/2023 | Oswal et al. |
| 2023/0281695 | A1 | 9/2023 | Freed et al. |
| 2023/0282006 | A1 | 9/2023 | Chatterjee et al. |
| 2023/0282201 | A1 | 9/2023 | Bissell et al. |
| 2023/0282206 | A1 | 9/2023 | Mahmood et al. |
| 2023/0283482 | A1 | 9/2023 | Kruse et al. |
| 2023/0283681 | A1 | 9/2023 | Xiao et al. |
| 2023/0283696 | A1 | 9/2023 | Naaman et al. |
| 2023/0290351 | A1 | 9/2023 | Sindhwani |
| 2023/0297213 | A1 | 9/2023 | Coffey et al. |
| 2023/0297327 | A1 | 9/2023 | Pasko |
| 2023/0298577 | A1 | 9/2023 | Yasa et al. |
| 2023/0305935 | A1 | 9/2023 | Dye et al. |
| 2023/0306135 | A1 | 9/2023 | Liao et al. |
| 2023/0306249 | A1 | 9/2023 | Huynh et al. |
| 2023/0306964 | A1 | 9/2023 | Borja Jaramillo |
| 2023/0315405 | A1 | 10/2023 | Morse et al. |
| 2023/0315541 | A1 | 10/2023 | Ganguly et al. |
| 2023/0315543 | A1 | 10/2023 | Ganguly et al. |
| 2023/0315717 | A1 | 10/2023 | Mesde et al. |
| 2023/0315899 | A1 | 10/2023 | Madl et al. |
| 2023/0315957 | A1 | 10/2023 | Atta |
| 2023/0316373 | A1 | 10/2023 | Xu |
| 2023/0316445 | A1 | 10/2023 | Mesde et al. |
| 2023/0316770 | A1 | 10/2023 | Mesde et al. |
| 2023/0317066 | A1 | 10/2023 | Hueser et al. |
| 2023/0317074 | A1 | 10/2023 | Moniz et al. |
| 2023/0322379 | A1 | 10/2023 | Metzner et al. |
| 2023/0322380 | A1 | 10/2023 | Champagne, Jr. et al. |
| 2023/0325266 | A1 | 10/2023 | Yang et al. |
| 2023/0325348 | A1 | 10/2023 | Vantrease et al. |
| 2023/0325384 | A1 | 10/2023 | Nallapati et al. |
| 2023/0325730 | A1 | 10/2023 | Bolt et al. |
| 2023/0328311 | A1 | 10/2023 | Martin et al. |
| 2023/0334046 | A1 | 10/2023 | Vig et al. |
| 2023/0334294 | A1 | 10/2023 | Huang et al. |
| 2023/0334547 | A1 | 10/2023 | Lagoni et al. |
| 2023/0344729 | A1 | 10/2023 | Dippenaar et al. |
| 2023/0351186 | A1 | 11/2023 | Vantrease et al. |
| 2023/0351458 | A1 | 11/2023 | Ye et al. |
| 2023/0351814 | A1 | 11/2023 | Wenneman et al. |
| 2023/0359383 | A1 | 11/2023 | Dinkar et al. |
| 2023/0359627 | A1 | 11/2023 | Pandis et al. |
| 2023/0362026 | A1 | 11/2023 | Bajaj et al. |
| 2023/0362265 | A1 | 11/2023 | McPherson et al. |
| 2023/0362276 | A1 | 11/2023 | Watson |
| 2023/0367546 | A1 | 11/2023 | Jayakumar et al. |
| 2023/0368028 | A1 | 11/2023 | Lupesko et al. |
| 2023/0368796 | A1 | 11/2023 | Liu et al. |
| 2023/0376857 | A1 | 11/2023 | Gokalp |
| 2023/0377574 | A1 | 11/2023 | McCraw et al. |
| 2023/0377583 | A1 | 11/2023 | Edara |
| 2023/0384948 | A1 | 11/2023 | Paterson-Jones et al. |
| 2023/0385233 | A1 | 11/2023 | Volpe et al. |
| 2023/0385319 | A1 | 11/2023 | Miller et al. |
| 2023/0385353 | A1 | 11/2023 | Prateek et al. |
| 2023/0388382 | A1 | 11/2023 | Bao |
| 2023/0393953 | A1 | 12/2023 | McAlister et al. |
| 2023/0394501 | A1 | 12/2023 | Cervantez |
| 2023/0394831 | A1 | 12/2023 | Stankovic et al. |
| 2023/0400990 | A1 | 12/2023 | Stefani et al. |
| 2023/0409362 | A1 | 12/2023 | Shevade et al. |
| 2023/0409363 | A1 | 12/2023 | Shevade et al. |
| 2023/0409514 | A1 | 12/2023 | Bshara et al. |
| 2023/0409528 | A1 | 12/2023 | Chirayath et al. |
| 2023/0409584 | A1 | 12/2023 | Venkatesan et al. |
| 2023/0412507 | A1 | 12/2023 | Shevade et al. |
| 2023/0418565 | A1 | 12/2023 | Arumugam Selvaraj et al. |
| 2023/0418566 | A1 | 12/2023 | Athiwaratkun et al. |
| 2023/0418567 | A1 | 12/2023 | Athiwaratkun et al. |
| 2023/0418936 | A1 | 12/2023 | Rahbar et al. |
| 2023/0418985 | A1 | 12/2023 | Rahbar et al. |
| 2023/0419036 | A1 | 12/2023 | Wang et al. |
| 2023/0419113 | A1 | 12/2023 | Genc et al. |
| 2023/0419957 | A1 | 12/2023 | Hertschuh et al. |
| 2023/0421955 | A1 | 12/2023 | Torok et al. |
| 2024/0006064 | A1 | 1/2024 | Naik et al. |
| 2024/0006147 | A1 | 1/2024 | Otten et al. |
| 2024/0006624 | A1 | 1/2024 | Wandera et al. |
| 2024/0006810 | A1 | 1/2024 | Carranza et al. |
| 2024/0006920 | A1 | 1/2024 | Cao et al. |
| 2024/0006934 | A1 | 1/2024 | Podhola |

FOREIGN PATENT DOCUMENTS

| | | | | | |
|---|---|---|---|---|---|
| CN | 116391186 | A | | 7/2023 | |
| CN | 116438785 | A | | 7/2023 | |
| CN | 116941215 | A | | 10/2023 | |
| DE | 112021004894 | T5 | | 7/2023 | |
| DE | 112021005026 | T5 | | 8/2023 | |
| DE | 112021005656 | T5 | | 8/2023 | |
| DE | 102023105761 | A1 | | 9/2023 | |
| DE | 102023107092 | A1 | | 9/2023 | |
| DE | 112021005378 | T5 | | 9/2023 | |
| DE | 112021006319 | T5 | | 9/2023 | |
| DE | 112022000280 | T5 | | 11/2023 | |
| DE | 112022001476 | T5 | | 1/2024 | |
| EP | 1770463 | A1 | * | 4/2007 | ............... G06F 8/10 |
| EP | 3462260 | A1 | * | 4/2019 | ....... G05B 19/41865 |
| EP | 4213019 | A1 | | 7/2023 | |
| EP | 4235427 | A2 | | 8/2023 | |
| EP | 4236203 | A2 | | 8/2023 | |
| EP | 4239952 | A1 | | 9/2023 | |
| EP | 4254189 | A2 | | 10/2023 | |
| GB | 2614819 | A | | 7/2023 | |
| GB | 2616813 | A | | 9/2023 | |
| GB | 2617713 | A | | 10/2023 | |
| GB | 2617745 | A | | 10/2023 | |
| GB | 2618037 | A | | 10/2023 | |
| GB | 2618276 | A | | 11/2023 | |
| GB | 2618928 | A | | 11/2023 | |
| GB | 2619140 | A | | 11/2023 | |
| KR | 20230121787 | A | | 8/2023 | |
| KR | 20230162083 | A | | 11/2023 | |
| WO | 2015173703 | A1 | | 11/2015 | |
| WO | 2020099934 | A1 | | 5/2020 | |

(56) References Cited

FOREIGN PATENT DOCUMENTS

| | | | |
|---|---|---|---|
| WO | 2021108123 | A1 | 6/2021 |
| WO | 2021183242 | A1 | 9/2021 |
| WO | 2021263036 | A1 | 12/2021 |
| WO | 2022055717 | A1 | 3/2022 |
| WO | 2022055770 | A1 | 3/2022 |
| WO | 2022060970 | A1 | 3/2022 |
| WO | 2022072201 | A1 | 4/2022 |
| WO | 2022072237 | A1 | 4/2022 |
| WO | 2022072283 | A1 | 4/2022 |
| WO | 2022072474 | A1 | 4/2022 |
| WO | 2022093636 | A1 | 5/2022 |
| WO | 2022109515 | A1 | 5/2022 |
| WO | 2022115446 | A1 | 6/2022 |
| WO | 2022115789 | A1 | 6/2022 |
| WO | 2022120585 | A1 | 6/2022 |
| WO | 2022125676 | A1 | 6/2022 |
| WO | 2022125752 | A1 | 6/2022 |
| WO | 2022125879 | A1 | 6/2022 |
| WO | 2022126064 | A1 | 6/2022 |
| WO | 2022126116 | A1 | 6/2022 |
| WO | 2023056183 | A1 | 4/2023 |
| WO | 2023097158 | A1 | 6/2023 |

OTHER PUBLICATIONS

Guidelines for Non-alarm Notifications, International Society of Automation, ISA-TR18.2.8-2023, Approved: Nov. 20, 2023. Using ISA-88 and ISA-95 Together, International Society of Automation, ISA-TR-88.95.01, Approved: Aug. 1, 2008.

Machine and Unit States: An implementation example of ISA-88. 00.01, International Society of Automation, ISA-TR88.00.02-2022, Approved: Sep. 6, 2022.

Batch Control Part 4: Batch Production Records, International Society of Automation, ISA-88.00.04-2006, Approved: Apr. 14, 2006.

Batch Control Part 2: Data Structures and Guidelines for Languages, American National Standard, ANSI/ISA-88.00.02-2001, Approved: Feb. 7, 2001.

Batch Control Part 1: Models and Terminology, American National Standard, ANSI/ISA-88.00.01-2010, Approved: Dec. 6, 2010.

Batch Control Part 4: Batch Production Records, International Society of Automation, ISA-88.00.04-2006, Approved: Apr. 25, 2006.

Batch Control Part 3: General and Site Recipe Models and Representation, International Society of Automation, ISA-88.00.03-2003, Approved: Mar. 14, 2003.

International Search Report and Written Opinion—PCT/NL2022/050682—mailing date Jun. 1, 2023.

* cited by examiner

200

METHOD OF PROCESSING DATA FROM A SUPERVISED PRODUCTION ENVIRONMENT

CROSS-REFERENCE TO RELATED APPLICATIONS

This application is a U.S. National Stage application under 35 U.S.C. § 371 of International Application PCT/NL2022/050682 (published as WO 2023/096490 A1), filed Nov. 24, 2022, which claims the benefit of priority to Application EP 21210314.7, filed Nov. 24, 2021. Benefit of the filing date of these prior applications is hereby claimed. Each of these prior applications is hereby incorporated by reference in its entirety.

TECHNICAL FIELD

The various aspects and variations thereof relate to acquisition of data values for parameters related to machines in a factory.

BACKGROUND

Programmable logic controllers—PLCs—are known and used for a longer time to monitor and control machines in a factory for manufacturing processes. Many different types of PLCs are available, providing their data to a user interface device in the factory. If a new device is added, the user interface device has to be configured by adding information on the PLC, one or more parameters monitored and/or controlled, a data communication protocol and possibly more.

SUMMARY

Managing PLCs in a factory and adding or modifying PLCs by letting existing PLCs monitor another or an additional parameter is a job requiring proper administration and can be arranged by one and the same service engineer, in one user interface device. But when data acquirable by all PLCs is to be monitored at a remote location, such modification of PLCs and user interface is generally not possible. Firstly, many communication protocols may have to be employed, of which no direct knowledge may be available at the remote location. Second, security may be an issue, for example if a communication pipe is kept open between sensor/PLC and a computer at the remote location. It is preferred to address—remove or at least alleviate—one or more of these issues or otherwise improve the current situation.

To this end, a first aspect provides, for execution in an electronic computing system, a method of processing device data available in a supervised production environment comprising production devices. The method comprises receiving a data request for providing production data related to a production parameter of a production device, obtaining device connectivity data related to the production device, setting up a data request message for requesting the production data in accordance with the device connectivity data and addressing a production device communication module of the production device in accordance with the device connectivity data. The method further comprises, if the addressing is successful, sending the data request message to the production device communication module in accordance with the device connectivity data, receiving the requested data related to a production parameter of the production device from the production device communication module; and presenting the received data.

In a conventional manufacturing environment, individual machines are provided with dedicated PLCs with dedicated data transmission protocols and connected to dedicated local monitoring equipment. Different machines may be provided with different PLCs, employing different data transmission protocols that have different formats for providing data and may even employ different formats for transmission of packets. With every machine having its own PLCs with proprietary protocols, central and remote access of each and every PLC is very difficult or may even be virtually impossible. This is in particular the case if new machines with new PLCs are added, with new protocols.

Using the method of the first aspect, connection data—Connectors—may be stored at a central place, for example at the manufacturing site. This data may be used by a local data hub to port data provided by machines—as sensed by sensors connected to PLCs—from the proprietary or open protocols used by the PLCs to one or more data protocols suitable for transmission of the data, which data transmission protocols may be more generic end/of more suitable for transmission of data using open networks, like the internet.

When a new machine and/or a new PLC is installed, data related to the new PLC and/or new machine and applicable sensors—and/or control actuators—and connection data in particular only needs to be added to the data hub, either on the manufacturing site or another central location. Subsequently, any other device may obtain the sensor data using the one or more generic data transmission protocols for retrieving the data for further processing and/or presenting the data to a user.

In a variation of the first aspect, the addressing comprises verifying whether the communication module can provide the data related to the production parameter. If the applicable communication module, for example a data hub or a PLC, cannot be reached, a warning may be triggered. As a result, another system may be made aware that repair may be required and/or that further querying a data value may not be feasible.

In another variation, the device connectivity data comprises an address of the production device communication module and verifying whether the communication module can provide the data related to the production parameter comprises verifying whether the communication module can be addressed using the address of the production device communication module comprised by the device connectivity data. This may be an efficient way of verification, as only a small amount of data may be required.

In a further verification, verifying whether the communication module can provide the data related to the production parameter comprises verifying whether the communication module has data available related to the production parameter. Sensor may malfunction, data may be acquired only every hour or every day, a connection between a PLC may be broken or there may be other reasons why not data may be available. This variation checks whether actual data is available and if this is not the case, a user or system may be prompted, upon which appropriate action can be taken based on this information.

Again another variation further comprises, if the verifying fails, set a status of the production parameter to a first classification. This allows for a clear communication and interpretation by an operator or a system.

In yet a further implementation, the device connectivity data comprises data related to a first data communication protocol arranged for communication with the production device communication module; and setting up a data request message in accordance with the device connectivity data comprises formatting the data request message in accordance with the first data communication protocol. This provides an example how the first aspect may be implemented.

In yet another variation, the received data related to the production parameter comprises a received data value for the production parameter. In this variation, the method further comprises verifying that the received data value is a value valid for the production parameter and, if the received data value is verified to be valid, set a status of the production parameter to a second classification. If the data can be validly retrieved and obtained, such second classification may be that, for example at a user interface end, the parameter is classified as valid.

In a further implementation, the received data related to the production parameter comprises a received data value for the production parameter. In this variation, the method further comprises comparing the received data value to an earlier data value for the production parameter, if the received data value is different from the earlier data value, set a status of the production parameter to a second classification. If a data value is received that appears to be valid and that is different from an earlier received value, it is in this variation assumed that a sensor has validly acquired a value in a changing process, meaning that the process runs, the sensor works, the PLCs works and that the system runs in accordance with specifications. In such case, the parameter may for example be classified as valid.

In again a further implementation, the received data related to the production parameter comprises a received data value for the production parameter. In this implementation, the method further comprises: comparing the received data value to an earlier data value for the production parameter and, if the received data value is the same as the earlier data value, set a status of the production parameter to a third classification. If there is no change whatsoever in the value of a parameter, either when a new value is received or not, it may be that there is a problem with data acquisition—or another problem. In any case, it is possible that the latter—unchanged—data value is not a correct representation of an actual situation and that the request for data is still pending. If that is the case, the parameter may be classified as such. Alternatively, the parameter may be classified as pending. And in another variation, if a data value is received and it is the same as the previously received data value, it may nonetheless be classified as valid, as a value has been received after all.

In yet another variation, the received data related to the production parameter does not comprises a received data value for the production parameter. In this variation, the method further comprises determining whether an earlier data value for the production parameter is available and, if no earlier data value for the production parameter is available, set a status of the production parameter to a third classification. If data is received in response to a data request, from the applicable PLC, the parameter and the applicable sensor exist—and may therefore be considered not to be invalid. On the other hand, classifying the parameter as valid may go too far, as no value is received. The parameter may in such case be classified as pending.

In again a further variation, applicable to all variations above and below, the data request message comprises a request for the value of the production parameter. Such data message provides a clear indication what data is sought.

In yet a further variation, the data request message comprises a request for meta data related to the production parameter. Such meta data may be time, data format—byte, nibble, word, long word, floating point data —, entity—width, height, temperature, humidity—, measure—kilograms, litres, millimetres, degrees Centigrade—, other, or a combination thereof, allowing efficient and comprehensible processing of data.

In another variation, the electronic computing system comprises a data server and a connectivity server. The method further comprises sending, by the data server, the connectivity data and a parameter identifier identifying the production parameter to the connectivity server, receiving, by the connectivity server, the connectivity data and the parameter identifier, wherein the connectivity server executes the setting up of the data request message, the addressing of the production device, the sending of the data request, receiving, by the connectivity server, the requested data related to the production parameter of the production device from the production device communication module and sending, by the connectivity server, the requested data related to the production parameter of the production device. In this way, data processing is efficiently distributed over multiple devices. The processing may be complemented by presenting data on an additional personal computing device.

In a further implementation, the requested data related to the production parameter received by the connectivity server is received in accordance with the first protocol; this variation further comprises setting up, by the connectivity server, a data presentation message comprising the requested data, in accordance with a second data communication protocol different from the first data communication protocol and sending, by the connectivity server, the requested data related to the production parameter of the production device to the data server in accordance with the second data communication protocol. This variation allows for more flexibility in use of different data communication protocols.

Yet a further variation further comprises sending, by the connectivity server, to the data server, a request for connectivity data and a parameter identifier wherein the sending of the connectivity data is executed in response to the request for connectivity data and a parameter identifier. This variation provides a particular safety; data retrieval is initiated by the connectivity server: the connectivity server asks the data server whether a request for data is received by the data server, for example by means of user input. If this is the case, the parameters for which data is requested or for which a new configuration is desired, are communicated by the data server to the connectivity server, per request of the connectivity server. With the connectivity server knowing what data servers are reliable and by only accepting data requests from such known and trusted data servers, no requests from unknown data servers will be accepted and processed.

Alternatively, the first aspect provides, for execution in an electronic computing system, a method of processing device data available in a supervised production environment comprising production devices. The method comprises receiving a data request for providing production data related to a production parameter of a production device. The method further comprises sending the data request message to the production device communication module in accordance with the device connectivity data, receiving the requested data related to a production parameter of the production device from the production device communication module; and presenting the received data. This alternative aspect may be implemented in combination with one or more of the variations described above.

A second aspect provides an electronic computing system arranged for processing device data available in a supervised production environment comprising production devices. The system comprises an input arranged to receive a data request for providing production data related to a production parameter of a production device and one or more a processing units arranged to obtain device connectivity data related to the production device, set up a data request message for requesting the production data in accordance with the device connectivity data, address a production device communication module of the production device in accordance with the device connectivity data and determine whether the addressing is successful. The system further comprises one or more a communication modules arranged to, if the addressing is successful, sending the data request message to the production device communication module in accordance with the device connectivity data, receive the requested data related to a production parameter of the production device from the production device communication module. The system further comprises an output arranged to present the received data.

Another aspect may provide a computer program product comprising computer executable code enabling a computer, when the executable code is provided in a memory connected to a processing unit of the computer, to execute the method of the first aspect or any variation thereof. A further aspect may provide a non-transitory memory holding such computer program product.

BRIEF DESCRIPTION OF THE DRAWINGS

The various aspects and variations thereof will now be elucidated in further detail in conjunction with drawings. In the drawings.

DETAILED DESCRIPTION

Figure 1:
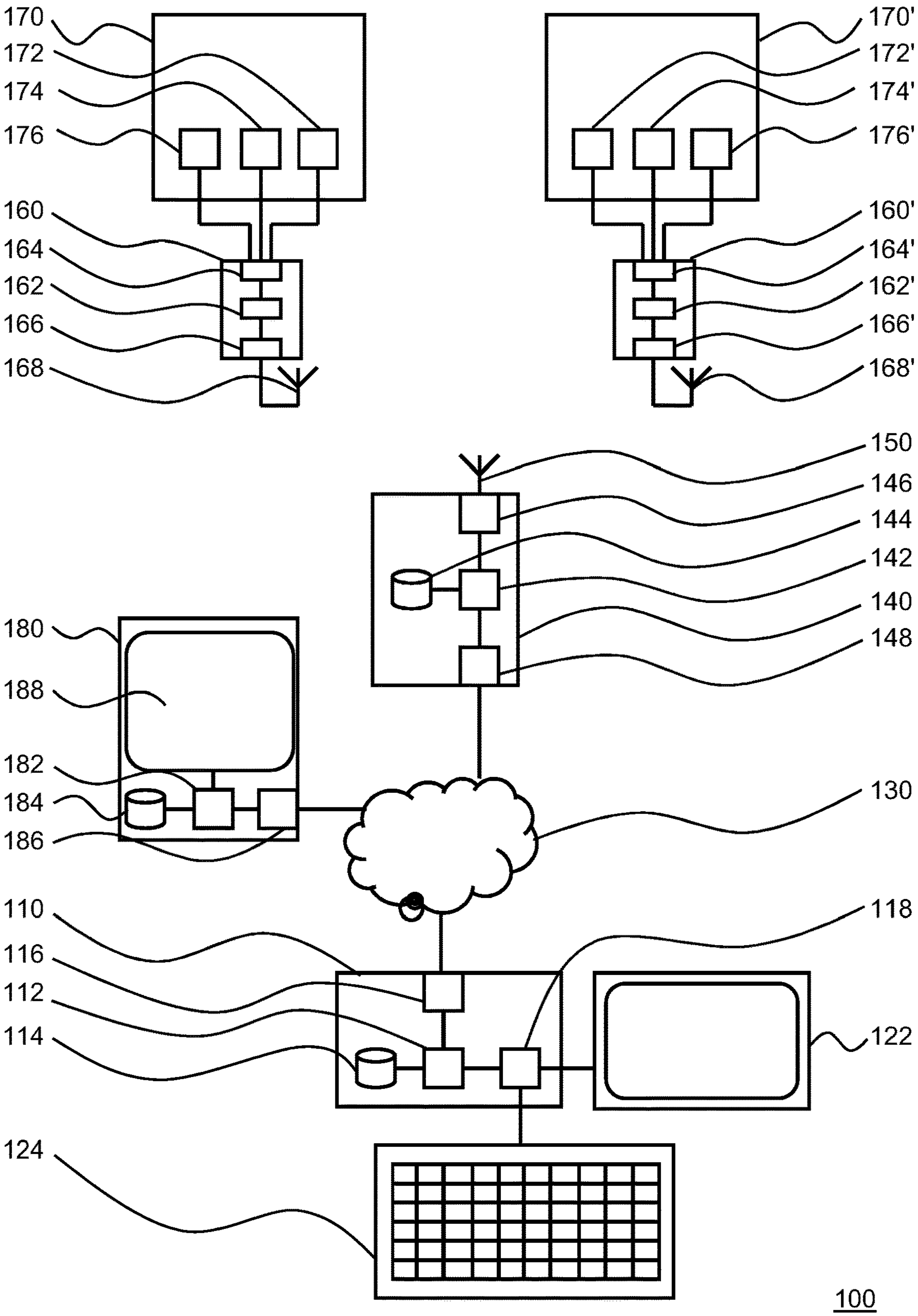
FIG. 1: shows a factory monitoring system.

FIG. 1 shows a factory monitoring system 100. The factory monitoring system 100 comprises a factory environment as a supervised production environment. The factory environment comprises a first machine 170 and a second machine 170'. The first machine 170 is provided with a first sensor 172, a second sensor 174 and a third sensor 176. The sensors are provided for monitoring various parts of the first machine 170. Such entities may be line speed, revolutions of an axle, a wheel or another rotating element, a characteristic of a substance like pressure, temperature, acidity, conductivity, other, or a combination thereof, vibrations of any part of the first machine 170, a force exerted on a part of the first machine 170, any other mechanical, electrical, physical, chemical property, other, or any combination of two or more of these.

The sensors are connected to a first machine communication module 160. The first machine communication module 160 may be implemented by means of a programmable logic controller. The first machine communication module 160 comprises a machine interface 164, a processing unit 162 and a network interface 166. The network interface 166 is connected to an antenna 168 for wireless communication. In another variation, the network interface 166 is arranged for wired network communication.

The machine interface 164 is arranged to receive signals from the sensors in the first machine 170, preferably electrical signals carrying information on the observed entity. The processing unit 162 is arranged to process the received electronic signal. The processing may include at least one of analogue to digital conversion, compression, statistical processing like calculating at least one of an average, a median, a standard deviation, encryption, encapsulation in a data package in accordance with a data communication, other, or a combination thereof. The network interface 166 is arranged to communicate the processed data to another communication device.

The second machine 170' is provided with sensors and a second machine communication module 160' in an equivalent way; equivalent parts are indicated by the same reference signs, complemented with a prime (').

Preferably in the vicinity of the first machine 170 and the second machine 170', a data hub 140 is provided as a variation of a connectivity server. The data hub comprises a hub processing unit 142, a hub memory 144 as a data storage module, a local network interface 146 and a hub wide area network interface 148.

The local network interface 146 provided with an antenna 150 and is arranged to receive data from the first machine communication module 160. Alternatively or additionally, the local network interface may be arranged for wired communication. The hub processing unit 142 is arranged to process the data received from the first machine communication module 160—and from the second machine communication module 160'. The processing may include at least one of analogue to digital conversion, compression, statistical processing like calculating at least one of an average, a median, a standard deviation, encryption, encapsulation in a data package in accordance with a data communication, other, or a combination thereof.

In one variation, data may be received from multiple machine communication modules provided in accordance with multiple standards. The local network interface 146 and the hub processing unit 142 are arranged to handle data received in accordance with each of the multiple standards. Furthermore, the local network interface 146 and the hub processing unit 142 are arranged to handle data received in accordance with each of the multiple standards are arranged to send messages to multiple machine communication modules in accordance with the multiple standards. As such, the local network interface 146 and the network interface 166 are arranged to communication in accordance with the multiple standards.

In one option, the hub memory 144 has data stored thereon related to data protocols with which each machine communication module is arranged to communicate. This data may be retrieved by the hub processing unit 142 to communicate with the machine communication modules. The hub memory 144 may also have data stored thereon for programming the hub processing unit. As such, the hub memory 144 may be a volatile, non-volatile, transitory or non-transitory memory or any combination thereof.

The hub processing unit 142 is further arranged to convert data received in accordance with the various protocols to data messages that may be transferred over a wide area network 130 to a data server 110 by means of the hub wide area network interface 148.

The data server 110 comprises a server side area network interface 116 arranged to communicate with the hub wide area network interface 148. The data server further comprises a server processing unit 112 for processing data received and for controlling further operation of the data server 110. The data server 110 comprises a server memory module 114 as a data storage module and is arranged for storing data received and to be sent, either processed or not.

The server memory module 114 may also have data stored thereon related to data protocols with which each machine communication module is arranged to communicate. As such, the server processing unit 112 may be arranged to compose data messages in accordance with data protocols with each of the machine communication modules are arranged to communicate. Furthermore, the server memory module may have data stored thereon for programming the server processing unit 112. As such, the server memory module 114 may be a volatile, non-volatile, transitory or non-transitory memory or any combination thereof.

The data server 110 is connected to an electronic display screen 122 as a visual output module and a keyboard 124 as a user input module via a user interface module 118 that is connected to the server processing unit 112. On the electronic display screen 122, an overview of data available for selection may be provided. Additionally or alternatively, options are provided to a user to query a particular machine communication module 160 for data related to a machine. The selection may be made by means of the keyboard 124 or, additionally or alternatively, at least one of other user input devices like a mouse, a voice instruction system, other, or a combination thereof.

Additionally or alternatively, data processed by the data server 110 may be accessible by means of a smartphone 180 as a personal computing device. The smartphone 180 comprises a smartphone network interface module 186 for connecting with the server side area network interface 116 for obtaining data relevant for a specific parameter of the first machine 170 or the second machine 170'.

To be able to provide data, a data supply protocol server may be provided by the data server 110 and the server side area network interface 116 in particular, for example a hypertext transfer protocol (http) server. The smartphone network interface module 186 may be provided with an http client for retrieving data.

The smartphone 180 further comprises a smartphone processing unit 182, a smartphone memory 184 as a data storage module and a touchscreen 188 as a user input and output device. The smartphone processing unit 182 is arranged for controlling operation of the smartphone 180. The operation may include processing requests for data received by means of the touch screen 188 and sending the requests for data to the data server 110 or directly to the data hub 140, by means of the smartphone network interface module 186.

The operation of the smartphone processing unit 182 may also include receiving data from the data server 110 or directly from the data hub 140. The data is received by means smartphone network interface module 186 and may be further processed by the smartphone processing unit 182. The data may be stored, in processed and/or received state, in the smartphone memory 184. The smartphone memory 184 may also have data stored in it for programming the smartphone processing unit 182. The processed data may be provided to a user by means of the touchscreen 188.

In one implementation, the processing of data provided by the data hub 140 is processed by the data server 110 and accessible for users by means of a personal computing device like the smartphone 180, a personal desktop or laptop computer, a virtual desktop client, other or a combination thereof. Such personal computing device may connect to the data server 110 via the network 130. Within the network 130, one or more virtual private networks or other secured data transmission pipes may be provided for secure data transmission.

Figure 2:
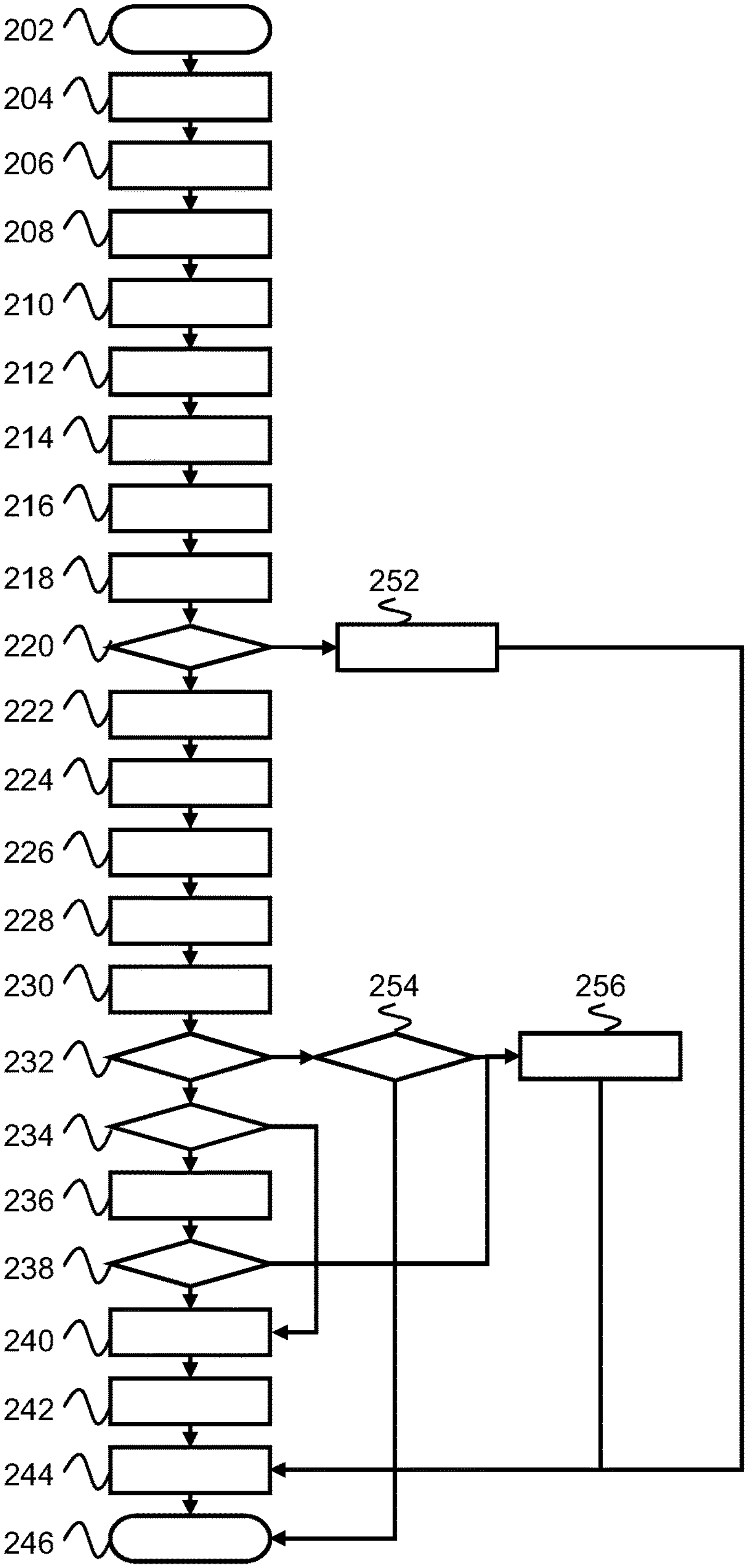
FIG. 2: shows a flowchart.

Further details and functionality of the factory monitoring system 100 will be discussed in further details in conjunction with a flowchart 200 as depicted by FIG. 2. The various parts of the flowchart 200 are briefly summarised in the list below.

202 start procedure
204 receive data request for a parameter
206 identify the applicable equipment
208 obtain connection data for the identified machine
210 compose data request message
212 send data request message to the data hub
214 receive data request message from the server
216 identify the addressed equipment
218 hail identified equipment
220 response back from equipment?
222 send request for data to the identified equipment
224 receive data response from the identified equipment
226 prepare data message for the server
228 send prepared data message
230 received prepared data message
232 valid data in the response for the parameter?
234 earlier parameter value available?
236 compare earlier parameter value to received parameter value
238 different value?
240 classify as valid parameter
242 present parameter value
244 present parameter classification
246 end procedure
252 classify as invalid
254 earlier value available?
256 classify as pending The procedure starts with a terminator 202 and proceeds to step 204 in which the data server 110 receives a request for data via the user interface module 118 or via the smartphone 180. With the data request, an identifier may be provided with which the applicable equipment or applicable machine may be identified. For example, a parameter may be selected on the electronic display device 122, which parameter is related to the first machine 170. Details on the parameter and the relation to the first machine may be stored on the server memory module 114. The first machine 170 is identified in step 204, based on the parameter selected.

In step 208, the data server 110 obtains connection data for the first machine 170. The connection data for the first machine may comprise a network address of the first machine communication module 160, a data communication protocol used by the first machine communication module 160, a sub address within the first machine communication module 160 for the first sensor 172, a data acquisition frequency, other or a combination of two or more of these. Using the selected parameter for which one or more data values are requested and the connection data, a data request message is composed in step 210 and sent to the data hub 140 in step 212 by means of the server side area network interface 116, via the network 130.

Optionally, the data server 110 does not send the request message to the data hub 140 until the data hub 140 specifically requests the data server whether the data server 110 has received any data requests or other requests on status of the first machine communication module 160. Until such request by the data hub 140 is received, the data server 110 may enter in a waiting loop and the data server 110 will only send the request message to the data hub once the request for new data requests has been received by the data server from the data hub 140.

In step 214, the data request message is received by the data hub 140 by means of the a hub wide area network interface 148. The data request message is processed by the hub processing unit 142 and as part of the processing, the machine address is identified in step 216. The identification may take place by retrieving the network address of the first machine communication module 160 from the data request message received. Alternatively or additionally, the data request message comprises another identifier of the first machine 170 and based on the other identifier, the hub processing unit 142 looks up data in the hub memory 144 to identify the first machine.

The data looked up and, if available, retrieved from the hub memory 144 may comprise address data. This means that the address data of the first machine 170 and/or the first machine communication module 160 may be obtained either in the data server 110, the data hub 140 or both. The identification looked up is used by the hub processing unit 142 to hail the first machine 170 or the first machine communication module 160 in step 218.

Hailing may comprise sending a request to send back a response message comprising a particular string; such string may comprise one byte or even less—or more data. Such data may be random or pre-determined.

In step 220, the hub processing unit 142 checks whether the first machine communication module 160 has sent back a response hub server 140 ad the local network interface 146 thereof in particular. If this is the case, a request for the data—a value of the parameter selected earlier—is prepared and sent to the first machine communication module 160 in step 222. However, if the hailing does not result in a response, the process branches to step 252 in which the parameter is identified as invalid. The procedure subsequently proceeds to step 244, in which the parameter is presented as invalid and the procedure ends in a terminator 246.

The determination that the selected parameter is identified as invalid may be communicated back to the data server 110 and this information may be presented to a user on the electronic display device 122. Following step 222, the data hub 140 receives a data response from the first machine communication module 160 in step 224, with a data value based on a signal received from the first sensor 172.

The value of a signal received from the first sensor 172 is processed by the first machine communication module 160 as discussed above and provided in a data message in accordance with a data communication protocol for which the network interface 166 is arranged to communicate. The local network interface 146 may be arranged to communicate using one or more different data communication protocols.

With the data received, the hub processing unit 142 prepares a data message for the data server 110 in step 226 to provide the data value for the selected parameter. The processing may concern general porting of data received, from one protocol to another, from a data communication protocol for which the network interface 166 is arranged to a data communication protocol generally used for communication over the network 130.

The data message thus prepared is sent in step 228 by the hub wide area network interface 148 and received by the server side area network interface 116 in step 230. In step 232, the data server and the server processing unit 112 in particular checks whether the data in the received message is valid. In particular, the server processing unit 112 checks whether the value provided for a data request related to the first sensor 172 is a value that may reasonably be expected.

If, for example, a temperature is measured, a value of 4000 is invalid for temperature in Kelvin—and a string of alphanumerical characters representing Roman letters is invalid as well. Otherwise, it may be that the value field in the data message is void, for example comprising random data or a string of zeros.

If it is determined in step 232 that the data received is invalid, the procedure branches to decision 254, in which the server processing unit 112 check whether an earlier value for the applicable parameter has been received that has been determined to be valid. If this is the case, the earlier received valid value is kept and the procedure proceeds to the terminator 246 to end the procedure. Also the classification of the parameter is not modified in a particular option for implementation.

If no earlier value has been received which is determined to be valid, the parameter is classified to be pending in step 256 and the procedure proceeds to step 244 to present the parameter as pending. Subsequently, the procedure ends in terminator 246.

If the received data value is considered to be valid, the procedure continues to step 238, in which the server processing unit 112 checks whether an earlier received value is available. If that is the case, the procedure continues to step 236; if this is not the case, the procedure jumps to step 240.

In step 236, the server processing unit 112 compares the earlier received value to the received value. in step 238, the server processing unit 112 decides that if the received value is the same as the earlier received value, the procedure is to branch to step 256 as discussed above. In another implementation, the comparing step 236 and the decision 238 may be omitted.

In step 240, the parameter is classified as valid, as a valid value for the parameter has been received in response to the latest request for data. In step 242, the value of the parameter is presented and in step 244, the classification of the parameter is presented. The data to be presented may be presented on the electronic display device 122. Step 242 and step 244 are interchangeable, as are other steps, unless this would not be possible, for example if one step would be dependent on the output of another.

The invention claimed is:

1. In an electronic computing system, a method of processing device data available in a supervised production environment comprising production devices, the method comprising:

receiving a data request for providing production data related to a production parameter of a production device;

obtaining device connectivity data related to the production device;

setting up a data request message for requesting the production data in accordance with the device connectivity data;

addressing a production device communication module of the production device in accordance with the device connectivity data, wherein the addressing comprises verifying whether the communication module can provide the data related to the production parameter;

if the addressing is successful, sending the data request message to the production device communication module in accordance with the device connectivity data;

receiving the requested data related to a production parameter of the production device from the production device communication module; and presenting the received data.

2. The method according to claim 1, wherein:

the device connectivity data comprises an address of the production device communication module; and verifying whether the communication module can provide the data related to the production parameter comprises verifying whether the communication module can be addressed using the address of the production device communication module comprised by the device connectivity data.

3. The method according to claim 1, wherein verifying whether the communication module can provide the data related to the production parameter comprises verifying whether the communication module has data available related to the production parameter.

4. The method according to claim 1, further comprising, if the verifying fails, setting a status of the production parameter to a first classification.

5. The method according to claim 1, wherein:

the device connectivity data comprises data related to a first data communication protocol arranged for communication with the production device communication module; and setting up a data request message in accordance with the device connectivity data comprises formatting the data request message in accordance with the first data communication protocol.

6. The method according to claim 1, wherein the received data related to the production parameter comprises a received data value for the production parameter, the method further comprising:

verifying that the received data value is a value valid for the production parameter;

if the received data value is verified to be valid, setting a status of the production parameter to a second classification.

7. The method according to claim 1, wherein the received data related to the production parameter comprises a received data value for the production parameter, the method further comprising:

comparing the received data value to an earlier data value for the production parameter; and if the received data value is different from the earlier data value, setting a status of the production parameter to a second classification.

8. The method according to claim 1, wherein the received data related to the production parameter comprises a received data value for the production parameter, the method further comprising:

comparing the received data value to an earlier data value for the production parameter; and if the received data value is the same as the earlier data value, setting a status of the production parameter to a third classification.

9. The method according to claim 1, wherein the received data related to the production parameter does not comprise a received data value for the production parameter, the method further comprising:

determining whether an earlier data value for the production parameter is available; and if no earlier data value for the production parameter is available, setting a status of the production parameter to a third classification.

10. The method according to claim 8, wherein the data request message comprises a request for the received data value for the production parameter.

11. The method according to claim 10, wherein the data request message comprises a request for meta data related to the production parameter.

12. The method according to claim 1, wherein the electronic computing system comprises a data server and a connectivity server, the method further comprising:

sending, by the data server, the connectivity data and a parameter identifier identifying the production parameter to the connectivity server;

receiving, by the connectivity server, the connectivity data and the parameter identifier;

wherein the connectivity server executes the setting up of the data request message, the addressing of the production device and the sending of the data request;

receiving, by the connectivity server, the requested data related to the production parameter of the production device from the production device communication module; and sending, by the connectivity server, the requested data related to the production parameter of the production device.

13. The method according to claim 12 wherein:

the device connectivity data comprises data related to a first data communication protocol arranged for communication with the production device communication module; and setting up a data request message in accordance with the device connectivity data comprises formatting the data request message in accordance with the first data communication protocol, wherein the requested data related to the production parameter received by the connectivity server is received in accordance with the first protocol, the method further comprising:

setting up, by the connectivity server, a data presentation message comprising the requested data, in accordance with a second data communication protocol different from the first data communication protocol; and sending, by the connectivity server, the requested data related to the production parameter of the production device to the data server in accordance with the second data communication protocol.

14. The method according to claim 1, the method further comprising:

sending, by the connectivity server, to the data server, a request for connectivity data and a parameter identifier;

wherein the sending of the connectivity data is executed in response to the request for connectivity data and a parameter identifier.

15. An electronic computing system arranged for processing device data available in a supervised production environment comprising production devices, the system comprising:

an input arranged to receive a data request for providing production data related to a production parameter of a production device;

one or more processors arranged to:

obtain device connectivity data related to the production device;

set up a data request message for requesting the production data in accordance with the device connectivity data;

address a production device communication module of the production device in accordance with the device connectivity data, by verifying whether the communication module can provide the data related to the production parameter; and determine whether the addressing is successful; and one or more a communication modules arranged to:

if the addressing is successful, send the data request message to the production device communication module in accordance with the device connectivity data; and receive the requested data related to a production parameter of the production device from the production device communication module; and an output arranged to present the received data.

* * * * *